(12) United States Patent
Berggren et al.

(10) Patent No.: US 12,439,365 B2
(45) Date of Patent: Oct. 7, 2025

(54) CONTROL CHANNEL FOR POSITIONING RELATED DATA

(71) Applicant: Sony Group Corporation, Tokyo (JP)

(72) Inventors: Anders Berggren, Lund (SE); Basuki Priyanto, Lund (SE); Shin Horng Wong, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 384 days.

(21) Appl. No.: 18/018,196

(22) PCT Filed: Aug. 3, 2021

(86) PCT No.: PCT/EP2021/071679
§ 371 (c)(1),
(2) Date: Jan. 26, 2023

(87) PCT Pub. No.: WO2022/029128
PCT Pub. Date: Feb. 10, 2022

(65) Prior Publication Data
US 2023/0276398 A1    Aug. 31, 2023

(30) Foreign Application Priority Data
Aug. 7, 2020    (SE) .................... 2030246-9

(51) Int. Cl.
*H04W 64/00*    (2009.01)
*H04W 4/029*    (2018.01)
*H04W 72/20*    (2023.01)

(52) U.S. Cl.
CPC .......... *H04W 64/00* (2013.01); *H04W 4/029* (2018.02); *H04W 72/20* (2023.01)

(58) Field of Classification Search
CPC ..... H04W 64/00; H04W 4/029; H04W 72/20; H04W 24/08; H04W 8/24; H04L 5/0007; H04L 5/0048; H04L 5/0094
See application file for complete search history.

(56) References Cited

U.S. PATENT DOCUMENTS 10,033,449 B2    7/2018   Lee et al.
10,285,153 B2    5/2019   Kim
(Continued)

FOREIGN PATENT DOCUMENTS

KR    20200087672 A    7/2020
WO    2020003896 A1    1/2020
(Continued)

OTHER PUBLICATIONS

International Search Report and Written Opinion from corresponding International Application No. PCT/EP2021/071679, mailed on Nov. 22, 2021, 13 pages.
(Continued)

*Primary Examiner* — Kabir A Timory
(74) *Attorney, Agent, or Firm* — Tucker Ellis LLP

(57) ABSTRACT

According to an aspect, a method is provided of operating a wireless communication device (UE) to provide positioning related data for determining a position estimate of the UE, the UE being connected to a communications network via a radio link, the method comprising: monitoring for a control channel associated with a positioning occasion in which the UE monitors for at least one positioning reference signal, wherein the control channel comprises an allocation configuration of resources for transmitting the positioning related data. According to further aspects, a method of operating a wireless communication device, a wireless communication device and an access node are provided.

16 Claims, 13 Drawing Sheets

(56) References Cited

U.S. PATENT DOCUMENTS

| | | |
|---|---|---|
| 12,200,659 B2 * | 1/2025 | Yoon ................ H04L 5/0051 |
| 2010/0323720 A1 | 12/2010 | Jen |
| 2015/0043355 A1 * | 2/2015 | Kim ................ H04L 1/1607 370/241 |
| 2018/0294934 A1 | 10/2018 | Kim et al. |
| 2022/0110085 A1 * | 4/2022 | Khoryaev ............ H04L 5/0051 |

FOREIGN PATENT DOCUMENTS

| | | |
|---|---|---|
| WO | 2020093358 A1 | 5/2020 |
| WO | 2020146739 A1 | 7/2020 |

OTHER PUBLICATIONS

Office Action and Search Report from corresponding Swedish Application No. 2030246-9, mailed on Apr. 16, 2021, 9 pages.

* cited by examiner

CONTROL CHANNEL FOR POSITIONING RELATED DATA

TECHNICAL FIELD

Examples generally relate to the transmission of positioning related data.

BACKGROUND

Mobile devices such as wireless communication devices (sometimes also referred to as user equipment; UE) offer various use cases. One use case is wireless communications. A further use case is positioning of the UE.

To facilitate positioning of UEs, multilateration or triangulation techniques can be employed. An example of multilateration is trilateration. Here, multiple access nodes (AN)—having a well-defined position in a reference coordinate system—transmit positioning signals (also referred to as positioning reference signals, PRSs). A UE can receive the PRSs; then it is possible to perform multilateration or triangulation. One particular positioning technique is observed time-difference of arrival (OTDOA).

OTDOA is, in particular, deployed in Third Generation Partnership (3GPP) cellular networks, such as the Long Term Evolution (LTE) 4G or New Radio (NR) 5G protocols. Here, the UE may receive PRSs from multiple base stations (BSs) or Transmission/Reception Points (TRPs) implementing the ANs and then performs a timing difference of arrival (TDOA) measurement. Results of the TDOA measurements in a form of Reference signal time difference (RSTD) report are transmitted from the UE to a location server (LS) using a positioning protocol (LPP). This is via the 3GPP radio access network (RAN). The LS then performs the positioning estimation based on multilateration and/or triangulation of at least two or at least three results of the TDOA measurements. See 3GPP Technical specification (TS) 38.305, V16.0.0 (2018-03), section 4.3.3.

Many regulatory as well as commercial use cases require obtaining a position estimate of a wireless communication device (UE) connected to a communications network via a radio link. Various location technologies are known to support these known regulatory as well as commercial use cases. For example, a location server node (LS) of the communications network may trigger a wireless communication device to perform a positioning measurement. Performing the positioning measurement may comprise receiving positioning reference signals from one or more access nodes of the communications network. The UE then has to transmit back the positioning measurement report to the LS. Heretofore, the UE sends an uplink scheduling request (SR) to the access node (AN) connecting the UE to the communications network. The AN connecting the UE to the communications network may also be called serving AN. The serving AN then sends back an uplink grant in a downlink control channel (PDCCH). Afterwards the UE can transmit the positioning measurement report on an uplink data channel (PUSCH) to the AN. The AN will then forward the measurement report to the LS.

SUMMARY

There may be a need for reducing the latency between providing the trigger, by the LS, to perform a positioning measurement and obtaining, by the LS, the measurement report.

Said need is addressed with the subject-matter of the independent claims. Advantageous embodiments are described in the dependent claims.

According to a first aspect, a method is provided of operating a wireless communication device (UE) to provide positioning related data for determining a position estimate of the UE, the UE being connected to a communications network via a radio link, the method comprising: monitoring for a control channel associated with a positioning occasion in which the UE monitors for at least one positioning reference signal, wherein the control channel comprises an allocation configuration of resources for transmitting the positioning related data.

According to a second aspect, a method is provided of operating an access node (AN) for receiving positioning related data for determining a position estimate of a wireless communication device (UE) the UE being connected to a communications network via a radio link between the UE and the AN, the method comprising: transmitting a control channel associated with a positioning occasion in which the UE monitors for at least one positioning reference signal, wherein the control channel comprises an allocation configuration of resources for transmitting the positioning related data.

According to a third aspect, a wireless communication device (UE) is provided comprising interface circuitry for connecting the UE to a communications network via a radio link, memory circuitry and processing circuitry, wherein the processing circuitry is configured for monitoring for a control channel associated with a positioning occasion in which the UE monitors for at least one positioning reference signal, wherein the control channel comprises an allocation configuration of resources for transmitting the positioning related data.

According to a fourth aspect, an access node (AN) is provided comprising interface circuitry for communicating within a communications network and for communicating with a wireless communication device (UE) via a radio link, memory circuitry and processing circuitry, wherein the processing circuitry is configured for: transmitting a control channel associated with a positioning occasion in which the UE monitors for at least one positioning reference signal, wherein the control channel comprises an allocation configuration of resources for transmitting the positioning related data.

It is to be understood that the features mentioned above and those yet to be explained below may be used not only in the respective combinations indicated, but also in other combinations or in isolation without departing from the scope of the invention.

DETAILED DESCRIPTION

Figure 1:
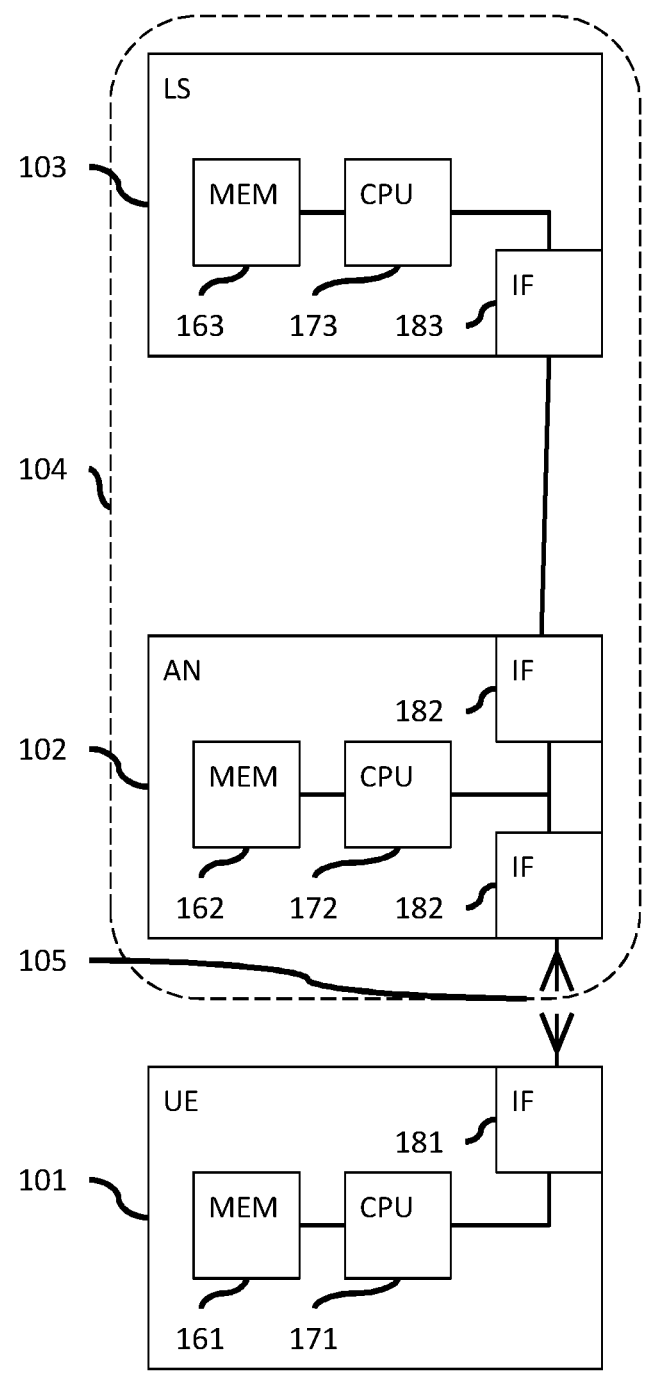
FIG. 1 schematically illustrates a communications network.

Some examples generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, examples of the disclosure will be described in detail with reference to the accompanying drawings. It is to be understood that the following description of examples is not to be taken in a limiting sense. The scope of the disclosure is not intended to be limited by the examples described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

FIG. 1 schematically depicts a communications network 104 and a UE 101 being connected to an AN 102 of the communications network 104 via a radio link 105. The UE 101 comprises processing circuitry 171 operably connected to memory circuitry 161 and interface circuitry 181. The processing circuitry 171 may be configured for performing exemplary methods as described herein. The interface circuitry 181 of the UE 101 and the interface circuitry 182 of the AN 102 may allow for communication on the radio link 105. The AN 102 comprises processing circuitry 172 operably connected to the interface circuitry 182 and to memory circuitry 162 for performing exemplary methods as described herein. The interface circuitry 182 may be directly or indirectly connected with interface circuitry 183 of a LS 103. Processing circuitry 173 of the LS 103 may be operably connected to the interface circuitry 183 and memory circuitry 163 for performing exemplary methods as described herein.

The LS can communicate with, e.g., the ANs and/or the UE using an NRPPa (NR Positioning Protocol A) protocol, and an LTE positioning protocol (LPP), respectively. The LS can determine/estimate the location (or position) of the UE. For the sake of simplicity, various scenarios are described hereinafter with respect to an implementation of the communications network by a cellular network. The cellular network includes multiple cells. Each cell corresponds to a respective sub-area of the overall coverage area. Other example implementations include Institute of Electrical and Electronics Engineers (IEEE) WLAN network, MulteFire, etc.

Figure 2:
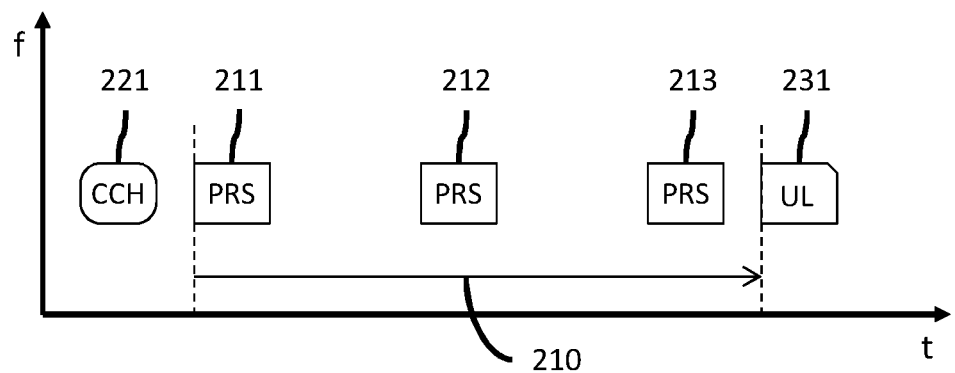
FIG. 2 illustrates time frequency resources.
Figure 11:
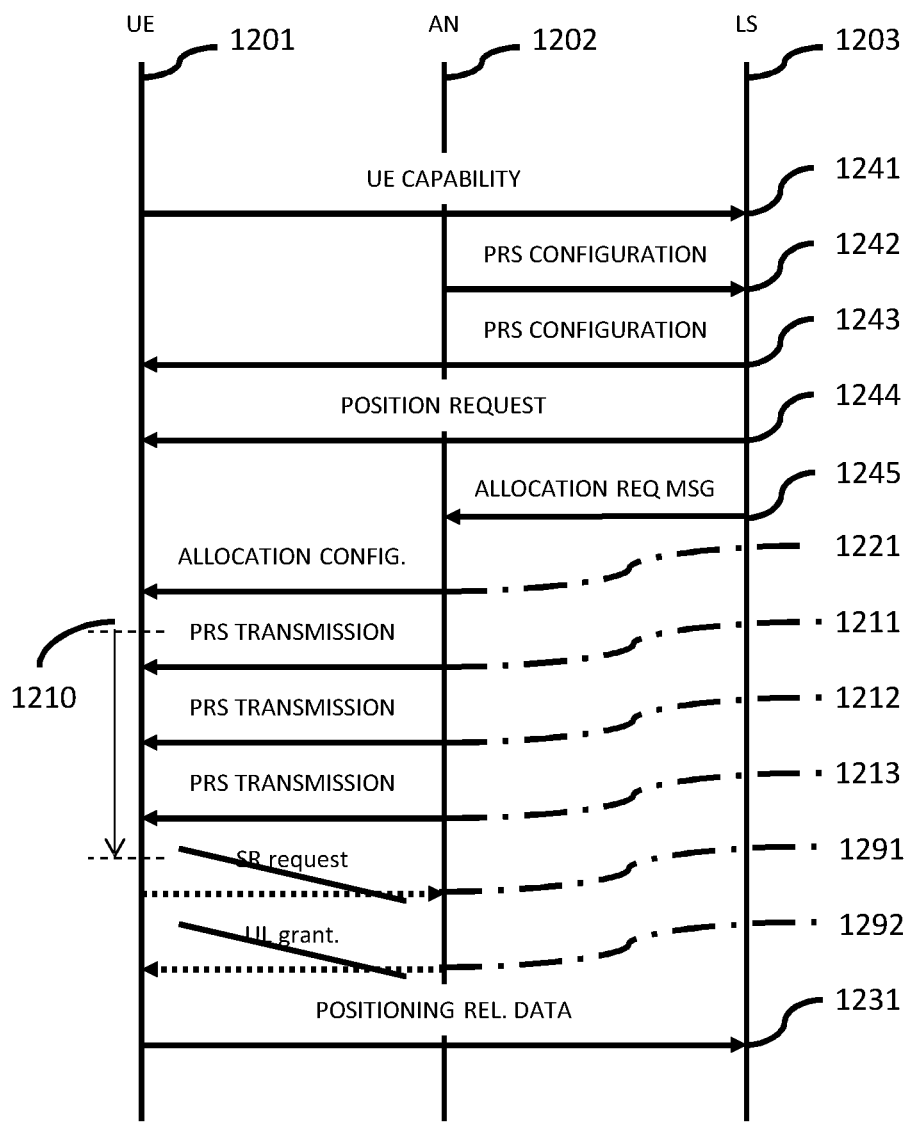
FIG. 11 illustrates a signaling diagram corresponding to FIG. 2.

FIG. 2 illustrates time-frequency resources which may be used when implementing a method of operating a UE to provide positioning related data for determining a position estimate of the UE, wherein the UE is connected to a communications network, in particular to an AN of the communications network, via radio link. FIG. 11 is an exemplary signaling diagram, which may relate to the FIG. 2.

The AN 202 may be a base station of a RAN. In examples, the AN 202 may be a gNB or a Transmission/Reception Point (TRP) according to the 3GPP 5G protocol. The AN 202 may also be an eNB according to the 3GPP 4G protocol. In other examples, AN may be an access point.

In examples described herein, the wireless communication device (UE) may be a user equipment (e.g., a mobile phone, a smartphone, a tablet, a laptop). The wireless communication device may also refer to other devices and appliances (e.g., sensors, controllers, actuators) used within the Internet-of-Things (IoT).

According to examples, the UE 1201 monitors for a control channel 221 associated with a positioning occasion 210/1210.

The positioning occasion 1210 may relate to a period in which the UE monitors for at least one positioning reference signal. Said period may also be called a measurement gap, particularly when the UE needs to perform inter-frequency measurement. Positioning occasions in which the UE monitors for at least one positioning reference signal are sometimes also applied in legacy methods. The positioning reference signals may be measured by the UE and a position measurement report or a position estimate may be later transmitted to the communications network, in particular to a location server node (LS) of the communications network.

As an example, FIG. 2 shows a positioning occasion 210 in which the UE 201 monitors for positioning reference signals 211, 212, 213 which are typically transmitted from multiple AN(s). The actual positioning reference signals 1211, 1212, 1213 received by the UE are shown in FIG. 11. The UE is expected to perform positioning measurements based on the received positioning reference signals. According to examples, the control channel 221 comprises an allocation configuration indicative of resources 231 for transmitting the positioning related data 1231. The positioning related data 1231 may comprise a position measurement report. In case the UE also has other uplink data to be transmitted (e.g. legacy data transmission), the UE should prioritize or only use resources 231 for transmitting the positioning related data 1231.

Thus, in contrast to legacy methods, the present disclosure avoids transmitting a dedicated scheduling request 1291 and a corresponding uplink grant 1292. Hence, latency of the proposed method may be improved with respect to legacy methods.

The proposed method is based on the idea that the AN 1202 may be aware that the UE has to provide position related data 1231 and may allocate the resources beforehand without a dedicated scheduling request 1291. Typically, the AN 1202 may be the serving AN of the UE.

In the example shown in FIG. 2, one control channel 221 and one resource 231 for transmitting the positioning related data 1231 are provided. However, according to further examples shown below, multiple control channels and multiple resources for transmitting the positioning related data may be provided.

As shown in FIG. 11, examples of the method may prescribe that the UE 1201 transmits its capabilities 1241 to a LS. The signal UE capability 1241 may indicate that the UE 1201 is capable of monitoring for the control channel 221. The AN 1202 may provide the LS 1203 with a signal 1242 indicative of the configuration of the positioning reference signals 211, 212, 213 to be sent to the UE 1201. The LS 1203 may transmit the configuration of the positioning reference signals 211, 212, 213 to the UE 1201 with a signal 1243. Signals 1242 and 1243 may correspond to signals used according to legacy methods, for example the signal as described in NRPPa (NR Positioning Protocol A) protocol and LPP (LTE Positioning Protocol) protocol, respectively.

There may be several position occasions 210, in which the AN 1202 transmits and the UE 1201 monitors for positioning reference signals 211, 212, 213. In particular, the position occasions may occur periodically. The signals 1241, 1242 and 1243 may be transmitted only once for several positioning occasions.

The LS 1203 may provide a position request 1244 to the UE 1201 via the AN 1202. The position request 1244 may comprise information detailing when the UE 1201 is to monitor for the control channel 221. Moreover, the LS 1203 may provide an allocation request message 1245 to the AN 1202. The allocation request message 125 may indicate that the AN 1202 has to allocate resources for receiving positioning related data 1231. The allocation request message 1245 may be provided after the position request 1244 as shown in FIG. 1. In alternative examples, the allocation request message may also be provided before the position request. Thereafter, the UE 1201 may receive the allocation configuration 1221 from the AN 1202 on the control channel 221.

In the example of FIGS. 2 and 11, the control channel 221 is foreseen before the positioning occasion 210 and the resource 231 for transmitting the positioning related data is foreseen after the positioning occasion 210. Thus, interference with the positioning reference signals or transmission of the control channel 221 within positioning occasion 210 may be avoided. Moreover, the resource 231 for transmitting the positioning related data 1231 is provided in close temporal proximity to the last positioning reference signal 213, 1213. Thus, in case of a moving UE, the positioning related data 1231 may more closely reflect the momentary position of the UE.

As explained before, the positioning related data 1231 may comprise measurement data derived from the positioning reference signals. Alternatively, or in addition, the positioning related data may comprise a position estimate derived by different means. For example, the positioning related data 1231 may comprise a position estimate obtained by using a Global Navigation Satellite System (GNSS). In another example, the positioning related data 1231 may comprise a positioning measurement obtained using a barometric sensor or a sensor of an inertial measurement unit (IMU).

In other examples, the positioning related data 1231 may also be used for controlling an operation of the AN 1202.

Generally, the control channel may provide the actual information in the form of parameters (e.g. MCS: Index 8; TBS: Index 20; Time/Frequency Domain Resource Assignment).

Alternatively, the control channel may provide the allocation configuration using an index which corresponds to a set of parameters of resource allocation: Index=1 (MCS=8, TBS=15; T/F); Index=2 (MCS=12, TBS=20,T/F), etc. The details of these indices are informed via upper layer (RRC) from the AN to the UE. The MCS may specify a Modulation and Coding Scheme as described in TS38.214. The TBS may specify a Transport Block Size as specified in TS38.214.

Figure 3:
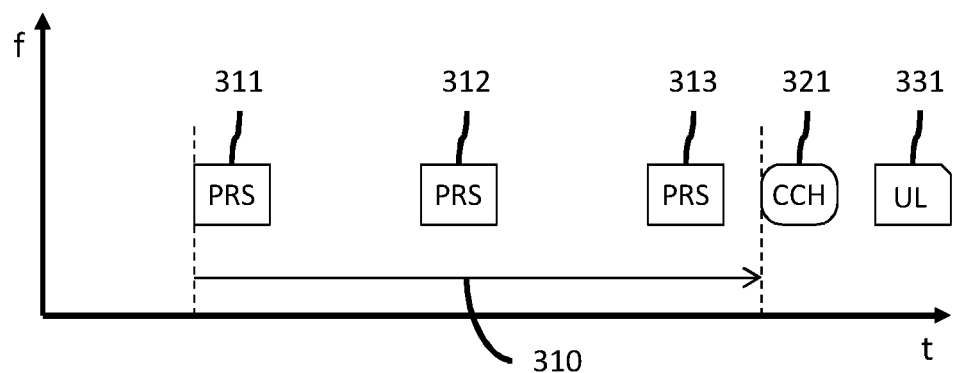
FIG. 3 illustrates time frequency resources.
Figure 12:
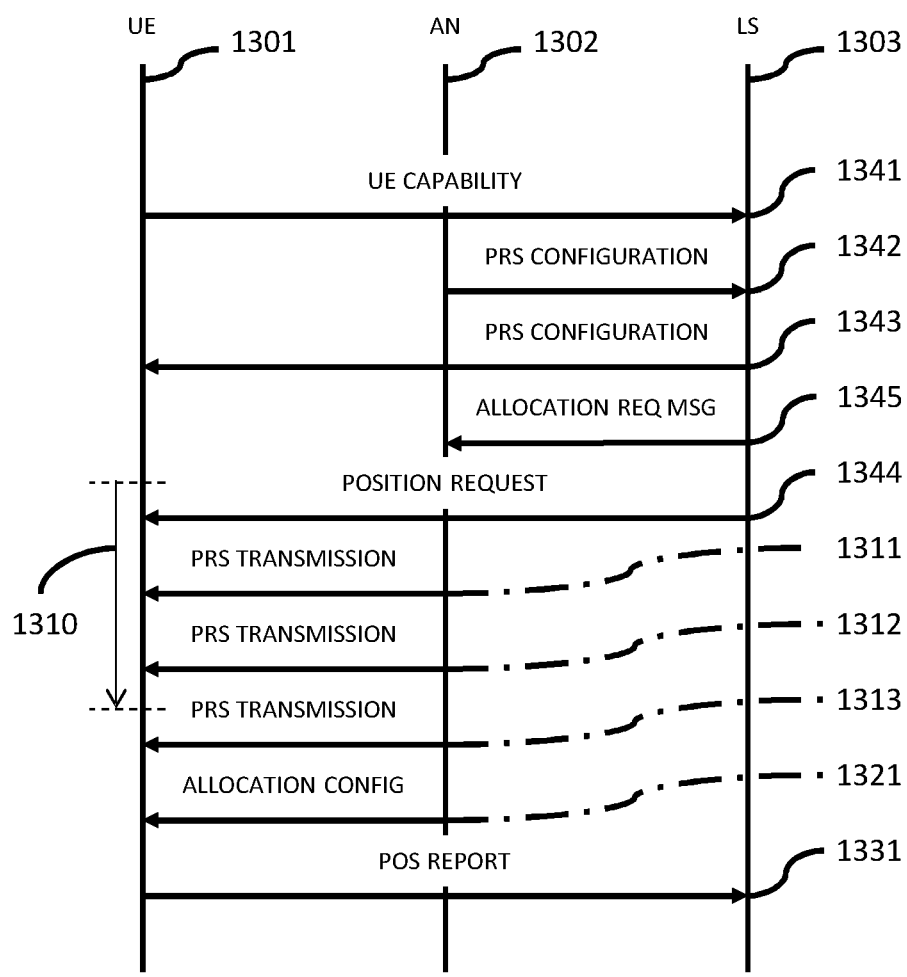
FIG. 12 illustrates a signaling diagram corresponding to FIG. 3.

FIG. 3 shows time frequency resources for implementing a further method of operating a UE 1301 to provide positioning related data. FIG. 12 shows a corresponding signaling diagram indicating the signals exchanged between the UE 1301, the AN 1302 and the LS 1303. The signals 1341, 1342, 1343, 1344, 1345, 1311, 1312, 1313 essentially correspond to the signals 1241, 1242, 1243, 1244, 1245, 1211, 1211, 1213 described with reference to FIG. 11. In contrast to the example of FIG. 11, the allocation request message 1345 is provided before the position request 1344. In the example of FIGS. 3 and 12, the control channel 321 is provided after the positioning occasion 310/1310, in which the positioning reference signals 311, 312, 313 are transmitted by the AN 1302. Thus, there may be less time between transmitting the allocation configuration 1321 and the resource 331 for transmitting the positioning related data 1331. Furthermore, interference with the positioning reference signals or transmission of the control channel 221 within positioning occasion 210 may be avoided because the control channel 221 is transmitted after the positioning occasion 210. Accordingly, the AN may specify the resource 331 for transmitting the positioning related 1331 at a later point in time and take into account further information obtained during the position occasion. Thus, the flexibility for determining a suitable allocation configuration 1321 is improved.

Figure 4:
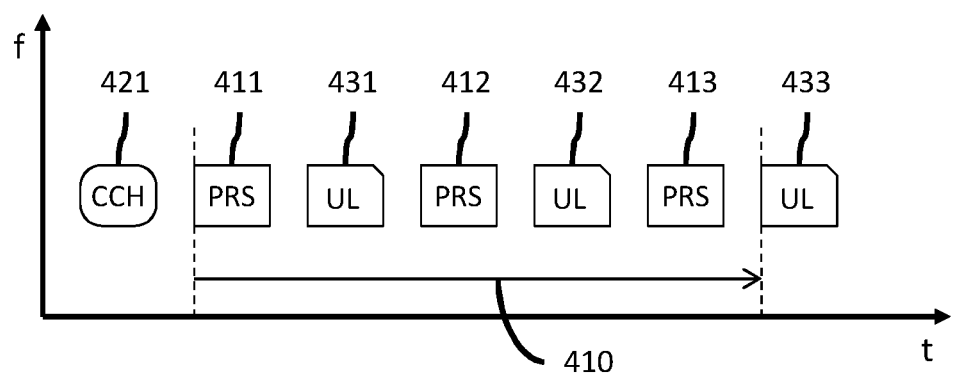
FIG. 4 illustrates time frequency resources.
Figure 13:
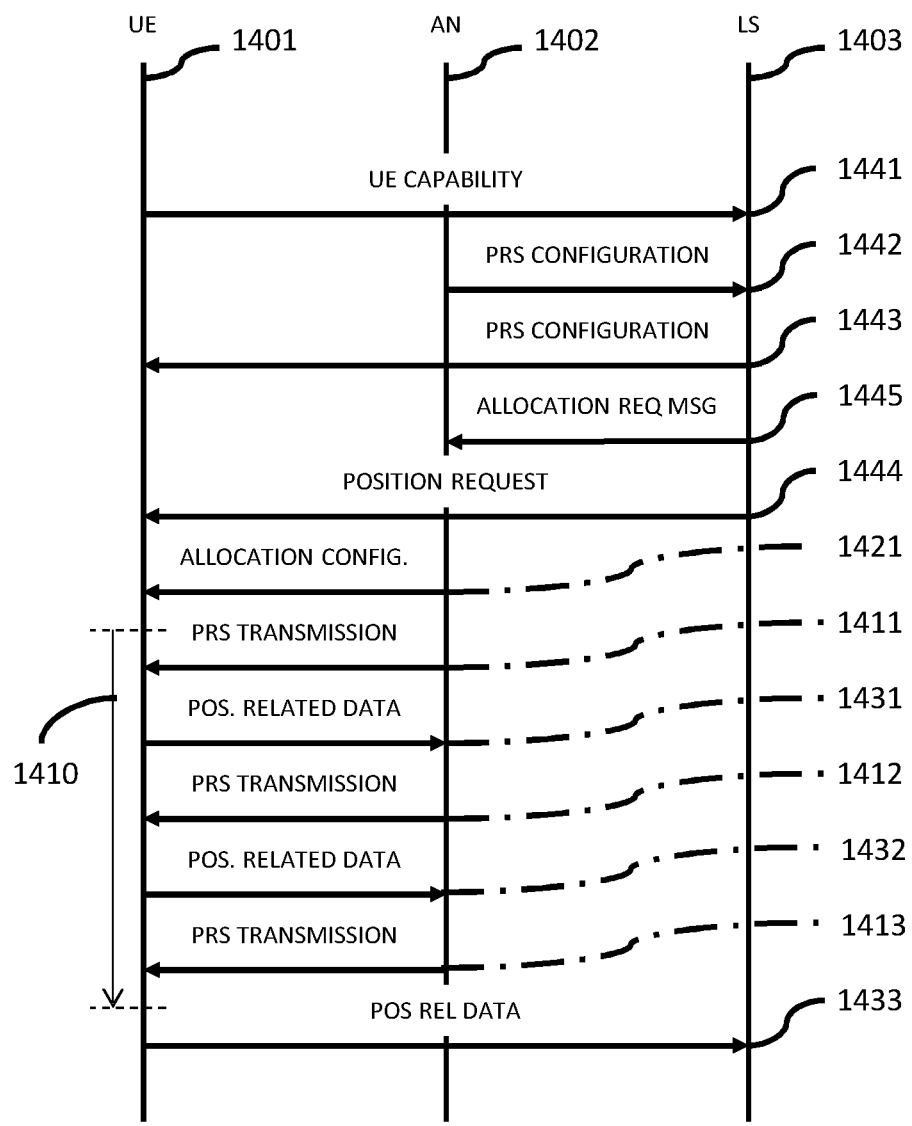
FIG. 13 illustrates a signaling diagram corresponding to FIG. 4.

FIG. 4 shows time frequency resources for implementing another method of operating a UE 1401 to provide positioning related data. FIG. 13 shows a corresponding signaling diagram indicating the signals exchanged between the UE 1401, the AN 1402 and the LS 1403. The signals 1441, 1442, 1443, 1444, 1445, 1421 essentially correspond to the signals 1241, 1242, 1243, 1244, 1245, 1221 described with reference to FIG. 11. Similarly to the example of FIG. 2/11, a control channel 421 is provided before the positioning occasion 410 in which the UE 1401 monitors for positioning reference signals 411, 412, 413. In contrast to the example of FIG. 2/11, the resources 431, 432, 433 are not only provided after the positioning occasion 410/1410 but also during the positioning occasion 410/1410. Accordingly, the resources 431, 432, 433 may be provided during a positioning period. Thus, the UE 1401 may split transmitting positioning related data 1431, 1432, 1433 between different resources 431, 432, 433. In other examples, the UE 1401 may use a resource 431, 432, 433 only when sufficient measurement data has been obtained. For example, receiving the positioning reference signals 1411, 1412 may not be sufficient to obtain a position estimate with a required accuracy. The required accuracy may only be met after reception of the positioning reference signal 1413. Accordingly, the UE 1401 may only use the resource 433 for transmitting positioning related data 1433.

Figure 5:
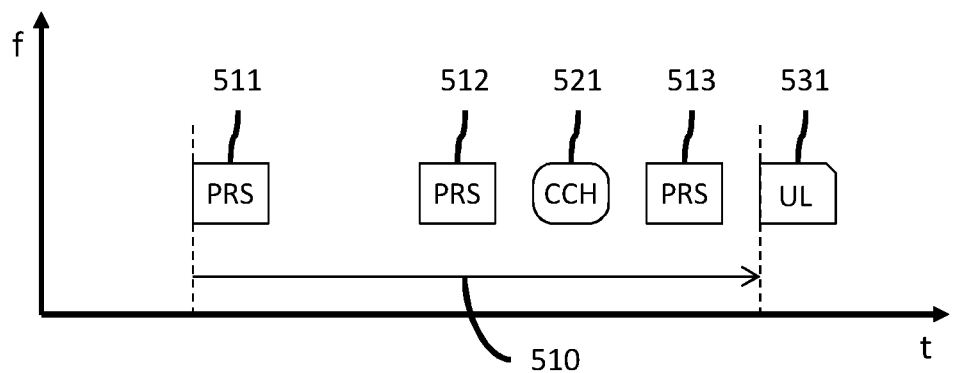
FIG. 5 illustrates time frequency resources.
Figure 6:
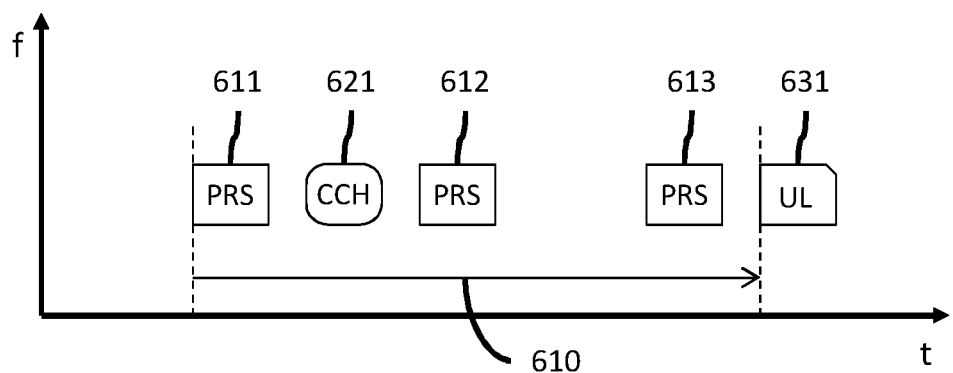
FIG. 6 illustrates time frequency resources.
Figure 7:
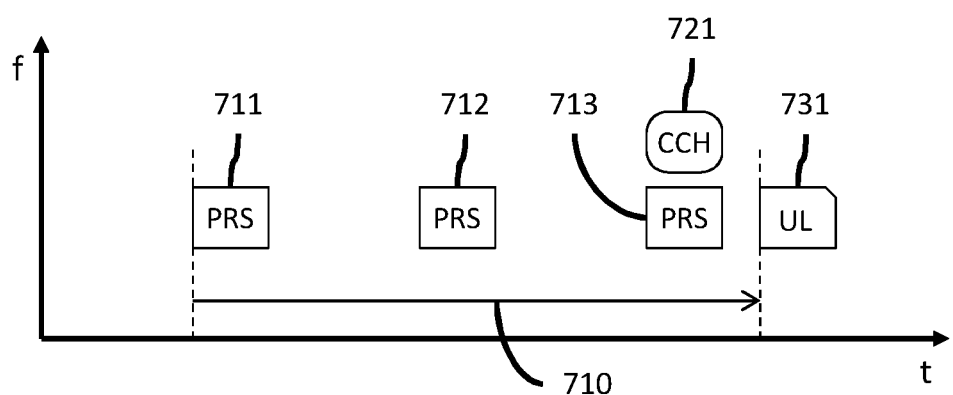
FIG. 7 illustrates time frequency resources.
Figure 14:
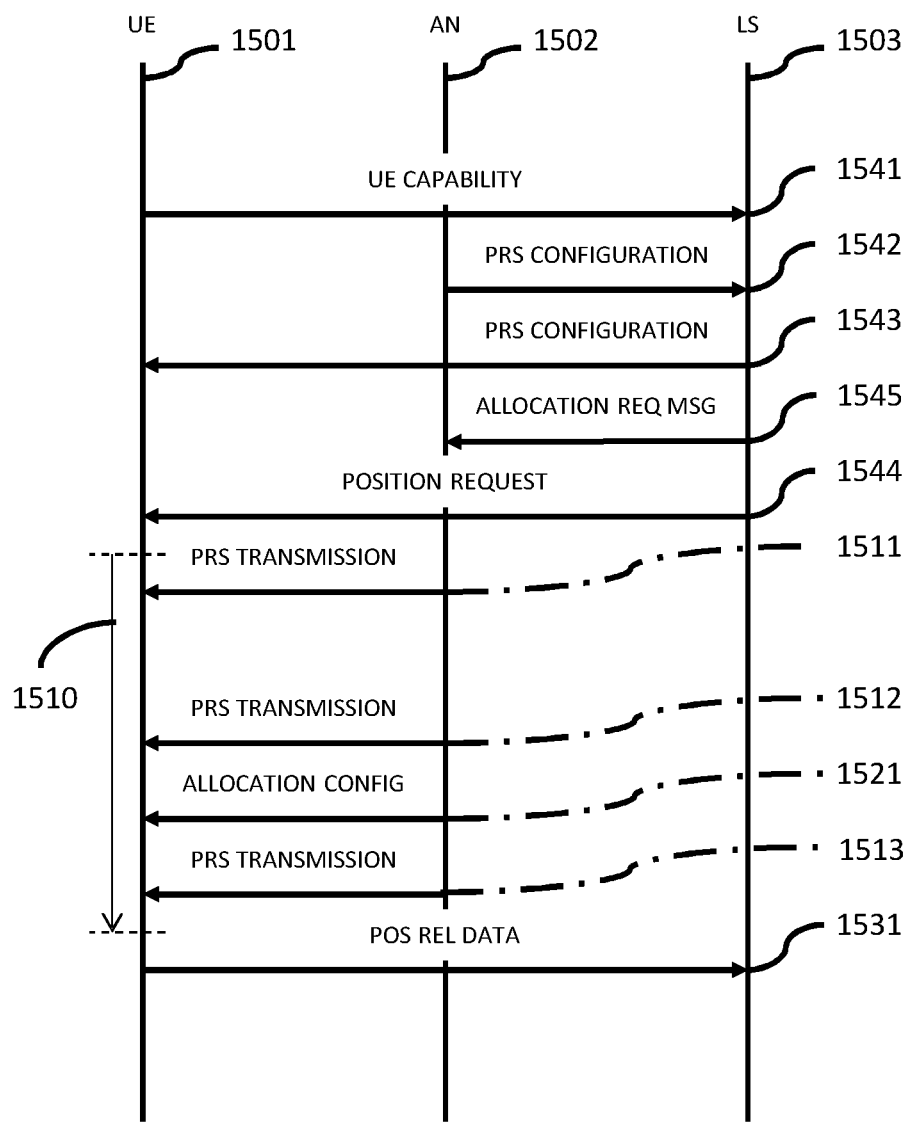
FIG. 14 illustrates a signaling diagram corresponding to FIG. 5.
Figure 15:
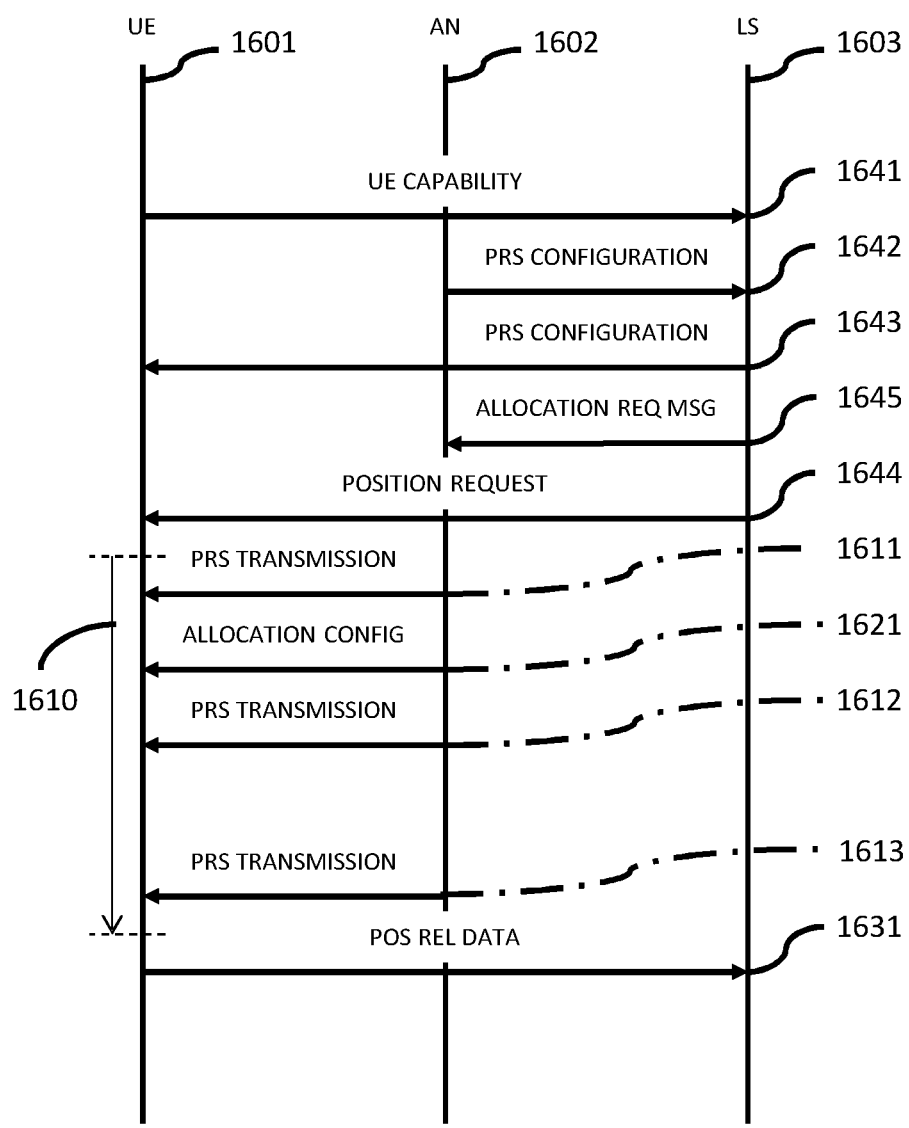
FIG. 15 illustrates a signaling diagram corresponding to FIG. 6.
Figure 16:
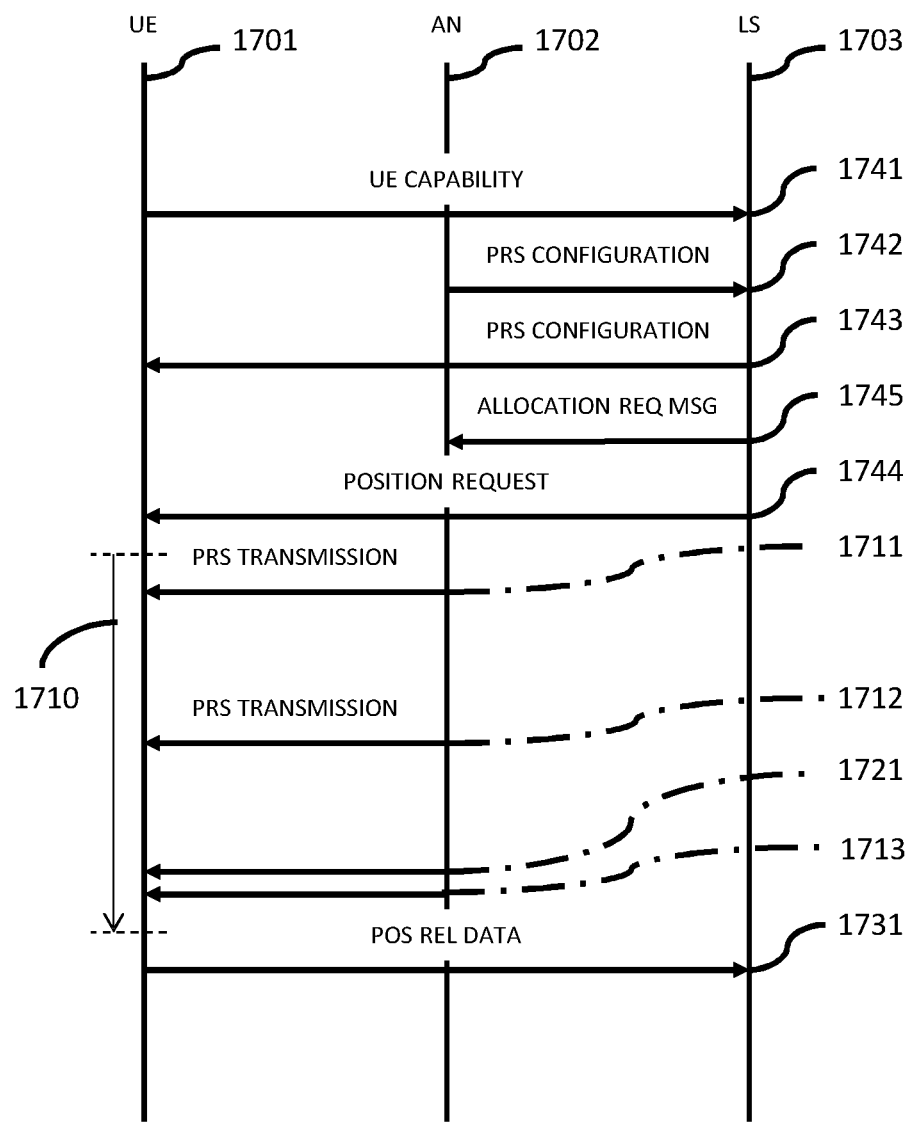
FIG. 16 illustrates a signaling diagram corresponding to FIG. 7.

FIGS. 5, 6, 7 illustrate time frequency resources for implementing a still further method of operating a UE 1501, 1601, 1701 to provide positioning related data. FIG. 14, 15, 16 show corresponding signaling diagrams indicating the signals exchanged between the UE 1501, 1601, 1701, the AN 1502, 1602, 1702 and the LS 1503, 1603, 1703, respectively. The UE 1501, 1601, 1701 monitors for positioning references signals 511/1511, 512/1512, 513/1513; 611/1611, 612/1612, 613/1613; 711/1711, 712/1712, 713/1713 during positioning occasions 510/1510, 610/1610, 710/1710, respectively, and transmits the positioning related data 1531, 1631, 1731 using resources 531, 631, 731, respectively. The signals 1541, 1542, 1543, 1544, 1545, 1521, 1641, 1642, 1643, 1644, 1645, 1621, 1741, 1742, 1743, 1744, 1745, 1721 essentially correspond to signals 1241, 1242, 1243, 1244, 1245, 1221 described with reference to FIG. 11. FIGS. 5, 6, 7 illustrate examples, in which the UE 1501, 1601, 1701 monitors for a control channel 521, 621, 721 during the positioning occasion 510, 610, 710.

As shown in FIG. 5, the UE 1501 may monitor for the control channel 521 before a predetermined positioning reference signal, in particular, before the last positioning reference signal 513. As already explained with respect to FIG. 3, a later provision of the control channel may improve the flexibility of the resource allocation.

The UE 1601 may also monitor for the control channel 621 after a predetermined positioning reference signal, in particular, before the first positioning reference signal 611, as shown in FIG. 6.

It is also conceivable that the UE 1701 monitors for the control channel 721 at the same time as monitoring for a positioning reference signal 713. In such an example, the control channel 721 may be provided in a different frequency domain than the positioning reference signal 713.

Figure 8:
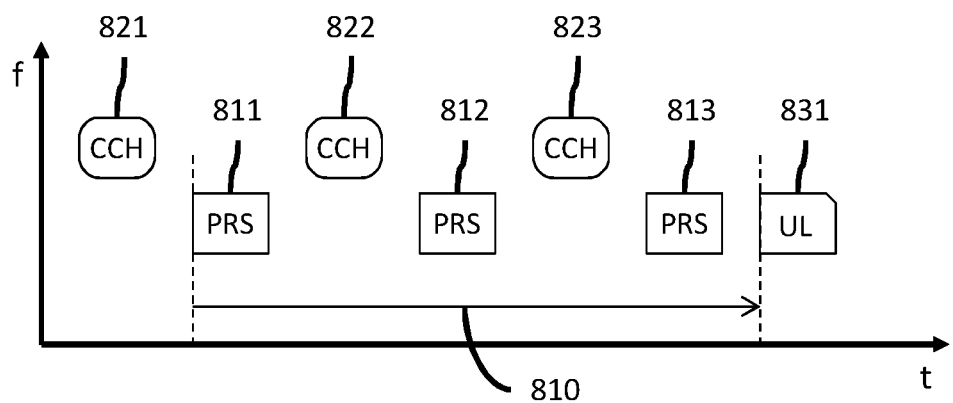
FIG. 8 illustrates time frequency resources.
Figure 17:
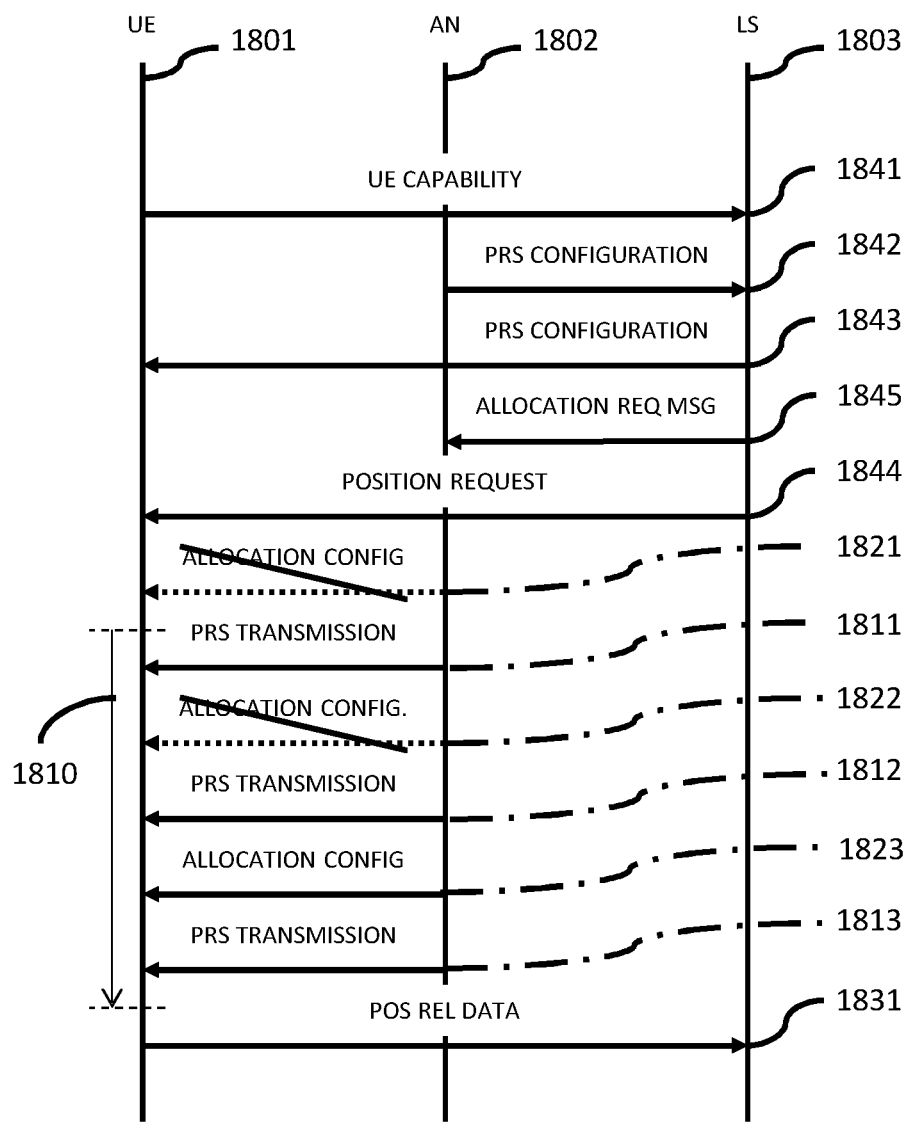
FIG. 17 illustrates a signaling diagram corresponding to FIG. 8.

FIG. 8 shows an example, in which the UE 1801 monitors for multiple control channels 821, 822, 823 before and during the positioning occasion 810/1810 in which the UE 1801 monitors for positioning reference signals 811/1811, 812/1812, 813/1813. As illustrated in the corresponding signaling diagram of FIG. 17 showing the signals exchanged between the UE 1801, the AN 1802 and the LS 1803, only the last control channel 823 is actually used to transmit the allocation configuration 1823. The allocation configuration 1823 may specify that the resource 831 is to be used for transmitting the positioning related data 1831. No allocation configuration 1821, 1822 is transmitted using the first two control channels 821 and 822. Thus, as shown in FIG. 8, the AN may choose whether to send the allocation configuration on any one or all of the multiple control channels.

The signals 1841, 1842, 1843, 1844, 1845 essentially correspond to the signals 1241, 1242, 1243, 1244, 1245 described with reference to FIG. 11.

Figure 9:
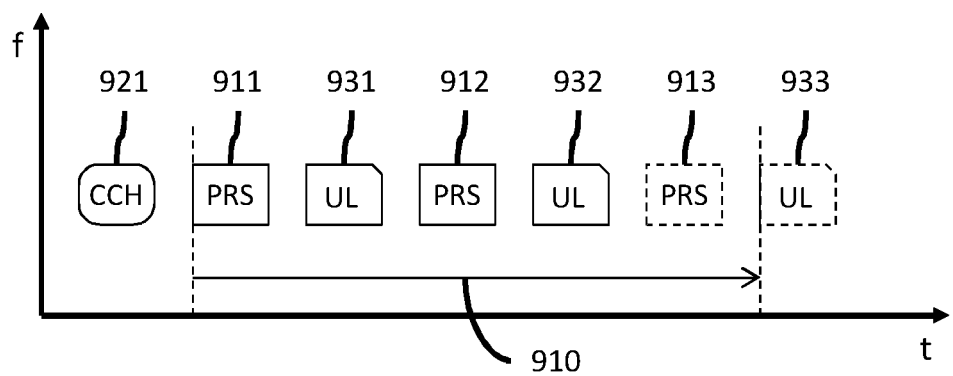
FIG. 9 illustrates time frequency resources.
Figure 10:
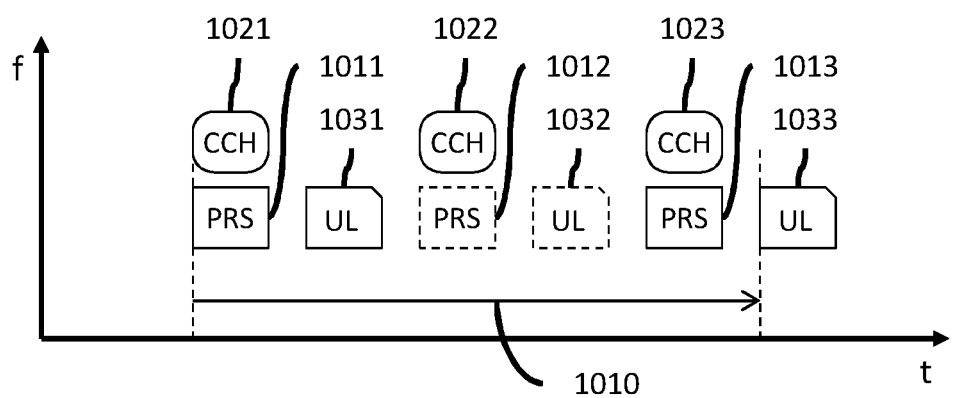
FIG. 10 illustrates time frequency resources.
Figure 18:
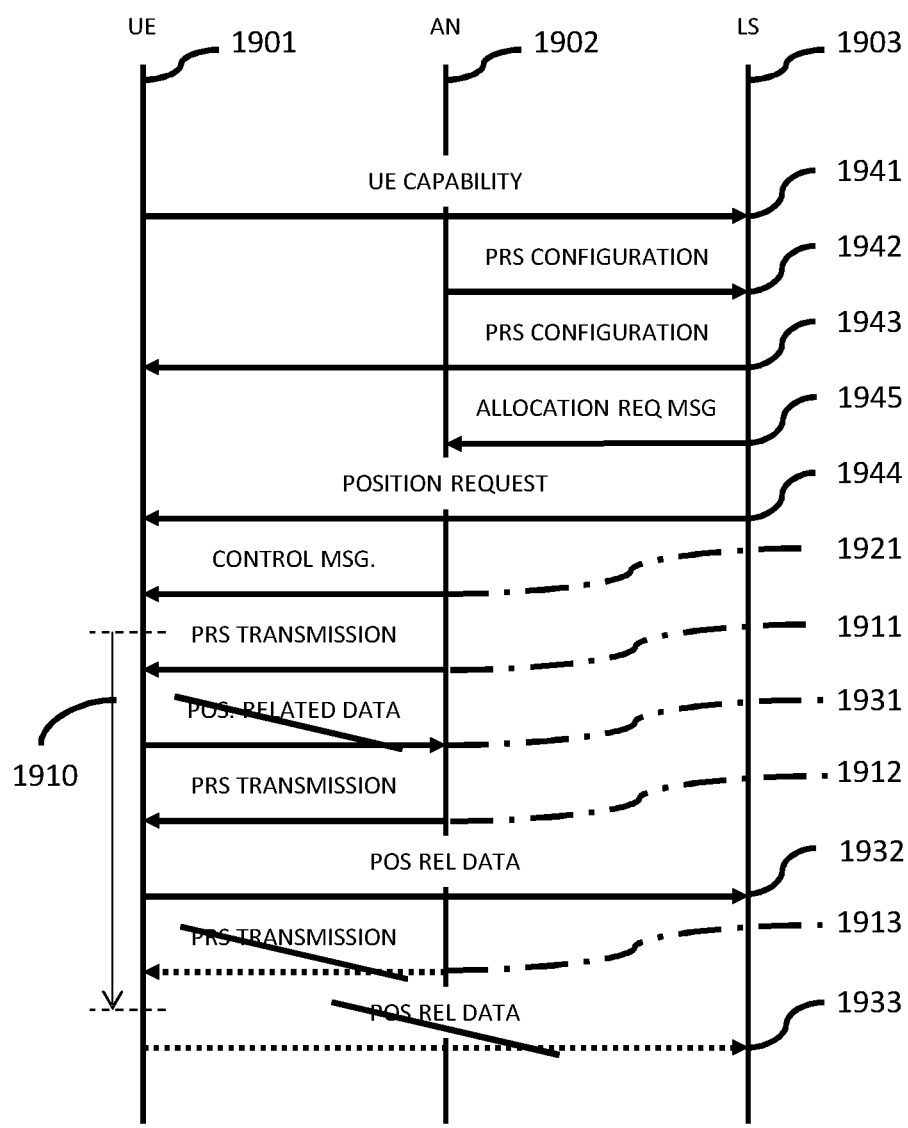
FIG. 18 illustrates a signaling diagram corresponding to FIG. 9.
Figure 19:
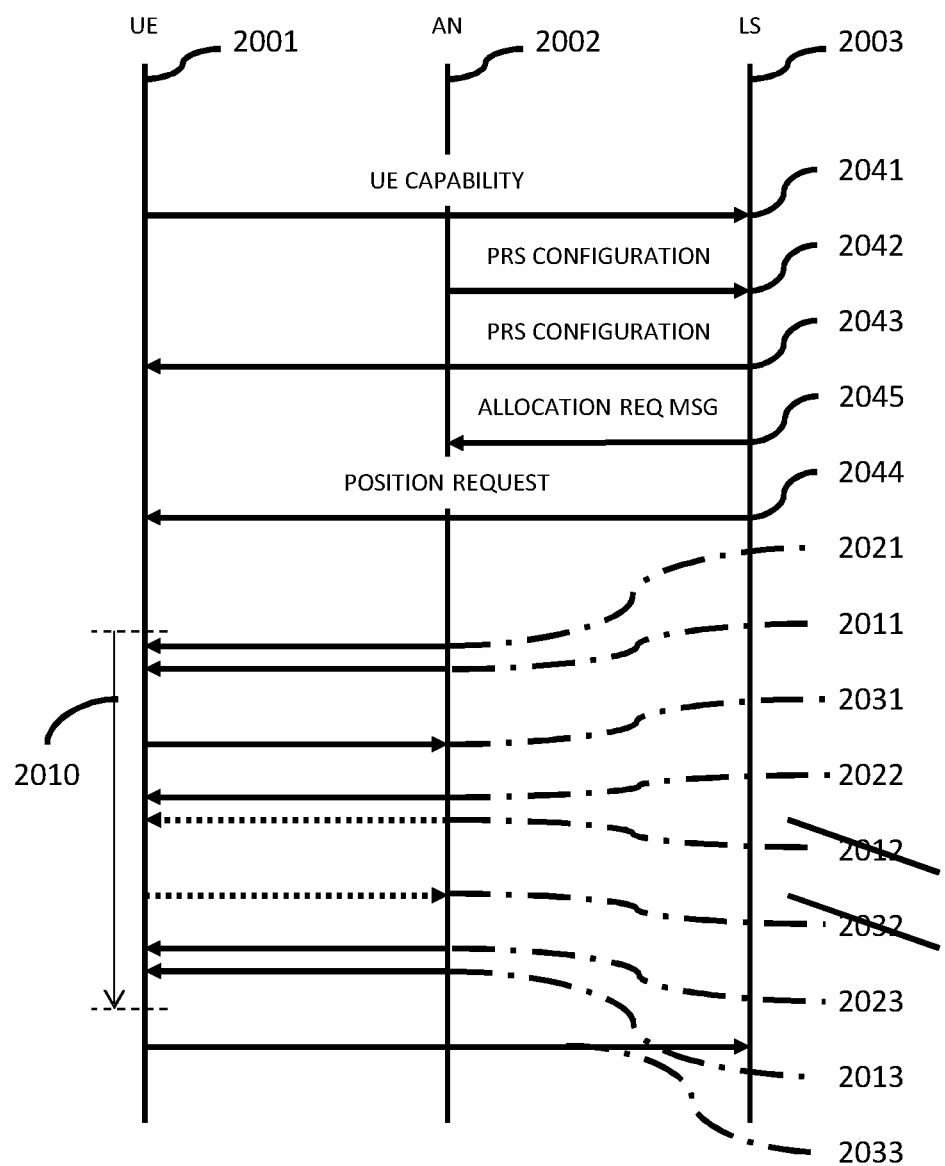
FIG. 19 illustrates a signaling diagram corresponding to FIG. 10.

FIGS. 9 and 10 together with the FIGS. 18 and 19 showing the signals exchanged between the UE 1901/2001, the AN 1902/2002 and the LS 1903/2003 illustrate examples of using the resources 931, 932, 933, 1031, 1032, 1033 for transmitting position related data different from measurement data and/or positioning estimates and control channels 921, 1021, 1022, 1023 used for transmitting control messages different from mere allocation configurations. The signals 1941, 1942, 1943, 1944, 1945; 2041, 2042, 2043, 2044, 2045 essentially correspond to the signals 1241, 1242, 1243, 1244, 1245 described with reference to FIG. 11.

As shown in FIG. 9, several resources 931, 932, 933 may be provided for transmitting position related data 1931, 1932, 1933. The resources may be indicated by a signal 1921 from the AN 1902. After having received positioning reference signals 1911, 1912 on resources 911, 912 during the positioning occasion 910/1910, the UE 1901 may have sufficient information to provide a positioning estimate. The UE 1901 may then transmit positioning related data 1932 including the positioning estimate. In response to receiving the positioning related data, the AN 1902 may de-allocate the further resource 933 that was previously allocated according to the allocation configuration. Alternatively, or in addition, the AN 1902 could also refrain from transmitting the positioning reference signal 1913 on the resource 913. Thus, resources actually not required anymore for obtaining the positioning estimate may be used for different purposes. Moreover, de-allocating and refraining from transmitting may lead to power savings. In some examples, de-allocating and refraining from transmitting may be performed automatically if positioning related data is received before the associated resources are required. In other examples, de-allocating and refraining from transmitting may be performed in response to an explicit indication comprised within the position related data. Moreover, de-allocating the resources may lead to improved resource efficiency as the resources can be used for other purposes.

According to FIGS. 10 and 19, a control message 2021 may be transmitted on the control channel 1021 indicating that the UE 2001 shall pause performing positioning measurements after receiving the positioning reference signal 1011/2011 during the positioning occasion 1010/2010 and transmit the preliminary positioning related data 2031 using the respective resource 1031. The AN 2002 may refrain from transmitting the positioning reference signal 1012/2012 and de-allocate the resource 1032. The control message 2022 on the control channel 1022 indicates that the positioning measurements are to be continued. Thus, the UE 2001 monitors for the positioning reference signal 1013/2013 and provides the positioning related data 2033 using the resource 1033 as indicated by the control message 2023 provided by the control channel 1023.

In some examples, multiple UEs may be connected to an AN. The control channel may comprise a temporary ID being associated with one or a group of the multiple UEs. Thus, the AN may provide an indication which resource may be used by which UE for transmitting the positioning related data. The multiple UEs may monitor for the same positioning reference signals. In particular, the control channel may be scrambled with a temporary ID for positioning purposes such that only the UE that is to transmit positioning related data can decode it. In examples, the control channel may be primarily designed as a UE specific control channel. In such a case, the control channel may also be scrambled with a temporary ID (e.g. positioning temporary ID).

In the examples shown in the figures, the positioning reference signals are transmitted by the same AN, which transmits the allocation configuration for simplification purposes.

Typically, the UE will receive positioning reference signals from a plurality of ANs. Receiving positioning reference signals from a plurality of ANs, which are provided at different physical locations, may improve the accuracy of positioning measurements. In extreme cases, the UE will not receive positioning reference signals from the AN, which transmits the control channel, but only from one or more different AN.

The one or more ANs described hereinbefore can have a well-defined position within a reference coordinate system and the UE can be positioned within the reference coordinate system. A receive property of the PRSs (e.g., time-delay, time difference, time-of-flight, angle of arrival (AoA), angle of departure (AoD), and/or signal strength) can be measured and the location of the UE can be estimated based on the receive property. As a general rule, a PRS defines a signal having a well-defined signal shape, e.g., encoding a well-defined bit sequence and/or comprising symbols of appropriate phase and amplitude. A PRS can be used to facilitate positioning. A PRS can be transmitted and/or received (communicated) in well-defined time-frequency resources. Based on a-priori knowledge about the PRS, it is possible to determine the receive property, e.g., amplitude, phase path loss, time-of-travel, and/or angle-of-arrival, etc.

Aspects of the disclosure may be summarized as follows below. 3GPP Rel-16 specified various location technologies to support regulatory as well as commercial use cases. Rel-17 NR Positioning address higher accuracy location requirements resulting from new applications and industry verticals. Enhancements and solutions to meet the following exemplary performance targets will be investigated and specified. For general commercial use cases (e.g., TS 22.261): a sub-meter level position accuracy (<1 m) is envisaged and for IIoT use Cases (e.g., 22.804) a position accuracy below 0.2 m is foreseen. The target latency requirement is <100 ms; for some IIoT use cases, latency in the order of even 10 ms is desired.

The Access & Mobility Function (AMF) of a NR (New Radio) positioning architecture may receive a request for a location service associated with a UE. Then, the AMF sends a location service request to a Location Management Function (LMF) where it has a connection to an Evolved Serving Mobile Location Centre (E-SMLC) as defined by the 3GPP 5G protocol. The E-SMLC or the location server (LS) has NR/E-UTRAN (Evolved UMTS Terrestrial Radio Access Network as defined by the 3GPP 5G protocol) access information. For example, the LS can trigger positioning measurement at the UE. When using DL-TDoA (Downlink-Time Different of Arrival) or DL-AoD (Downlink-Angle of Departure), the UE performs positioning measurements based on the positioning reference signals (PRS) from the AN, in particular gNB(s). PRSs are typically transmitted periodically and simultaneously from multiple gNBs. The UE performs reference signal time difference (RSTD) measurements and/or reference signal received power (RSRP) measurements. The UE transmits the positioning measurement report back to the E-SMLC via one of the gNB. The E-SMLC calculate the positioning estimate based on the received positioning measurement. From this simple illustration, it can be observed that the end-to-end latency may involve many signaling paths in both core network and radio access network.

Furthermore, signaling in the legacy radio access network may be described as follows. The LS sends positioning measurement request to the UE via an LPP protocol (and transparent to gNB). The UE performs measurement within a measurement gap, particularly when PRS from multiple gNB(s) are scheduled. Once the UE obtains the positioning measurement data, the UE sends an uplink scheduling request (SR) to the serving gNB. The serving gNB sends the corresponding UL grant in the downlink control channel (PDCCH). The UE can then transmit the positioning measurement reports in the uplink data channel (PUSCH) to the LS.

Considering NR Rel-17 is targeting significantly lower end-to-end latency, any attempt to reduce the signaling can be beneficial in order to reduce the latency and meet the latency requirement. Thus, it is proposed to introduce a method to avoid scheduling requests. Instead the UE is to monitor for a control channel in association with the PRS resource set. Once the UE is able to decode the control channel (which contain UL configuration) and the UE has a positioning measurement, the UE transmits the positioning measurement report.

According to examples, the UE is to monitor for a control channel that is associated with the PRS resource set. The control channel contains uplink grant for positioning measurement report purposes, i.e. scheduling PUSCH resource to carry the measurement report. The following are embodiments where this control channel (PDCCH POS) can be transmitted to the UE. The control channel may be transmitted before PRS transmission (i.e. at measurement gap request). Alternatively, the control channel may be transmitted at the last PRS resource set (right before or after). This may avoid a long gap (at least 160 ms) between the control channel and the actual uplink grant for positioning measurement report (PUSCH POS). It is also conceivable that the control channel is transmitted during PRS transmission. This may require the UE to monitor both PRS and PDCCH search space. Generally, also UE negotiation to determine when the UE is required to monitor uplink grant for positioning depending on UE channel condition (SNR), UE capability, UE required accuracy (i.e. high accuracy may require more PRS sets) may be foreseen. This negotiation can be made prior to the PRS transmission. Alternatively, the UE may be given an UL Grant after X number of PRS resource but, instead of providing a measurement report using the resource scheduled by this UL Grant, the UE informs the gNB that it requires a further Y more PRS measurements to meet the required accuracy. The UE then provides the measurement report after X+Y PRS Resource sets.

Other examples provide multiple control channels: gNB allocates a control channel associated with each PRS resource set or a consecutive set of PRS resources and the UE monitors each of them. This is beneficial when the number of PRS measurements required by the UE for a targeted accuracy is not known to the gNB and so it provides several opportunities for the UE to receive an UL grant for a PUSCH resources to send a potential measurement report. Once the UE is able to decode one of the earlier control channels, the gNB can cancel the remaining control channels, e.g. once the UE sends a measurement report the gNB can cancel the remaining UL grants. In another implementation/embodiment, when the gNB provides multiple control channels (UL Grants), the UE can use one of these UL Grant resources to inform the gNB of the number of PRS measurements it requires so that the gNB can cancel some of these UL grants. For example, the gNB may initially provide an UL Grant for every 2 sets of PRS resources, the UE, after determining the signal quality of the PRS, may tell the gNB that it needs 8 measurements before it can provide a report using the resource scheduled by the 1st UL Grant. The gNB can then cancel the 2nd and 3rd UL grants. The UE uses the resources scheduled by the 4th UL Grant to transmit its measurement report. The UE can be given multiple control channel monitoring occasions every X number of PRS resource set but the gNB may or may not actually send a control channel (PDCCH carrying an UL Grant) to the UE. However, every time the UE detects an UL Grant, it will send a measurement report. This allows the gNB to get updates on the UE measurement. The control channel can also indicate a "STOP" command to the UE to indicate that the gNB has sufficient reports and the UE can stop measuring PRSs and stop monitoring for this PRS associated Control Channel. The LS indicates at least one of the gNBs to allocate UL resources for POS measurement report. Hence, the gNB can transmit PDCCH POS. The properties of the aforementioned control channel (PDCCH POS) can be an uplink grant with new features e.g. new fields as downlink control information (DCI) as follows: The control channel can be scrambled with a temporary ID for positioning purpose (e.g. POS-RNTI). In this case, only the UE that has the need to perform positioning measurement report can decode it. The control channel can be primarily designed as a UE-specific control channel. Hence, it can also be scrambled with a temporary UE-ID. If it is designed for group/cell specific, scrambled with POS-RNTI above can be sufficient. The control channel may contain:

a. Information on the resources for positioning measurement report (UL grant): TBS, MCS, F/T resources.
b. PRS resource activation (in case the control channel is transmitted prior to PRS transmission).
c. Measurement gap information (in case the control channel is transmitted prior to PRS transmission).
d. UE ID that is allowed to transmit positioning measurement report.
e. A "STOP" command to tell UE to stop PRS measurement and provide the last measurement report.
f. A "CONTINUE" command to tell the UE to continue PRS measurement and continue monitoring for this Control Channel at a pre-defined/pre-configured periodicity (e.g. every X PRS resource sets)

Although the disclosure has been shown and described with respect to certain preferred examples, equivalents and modifications will occur to others skilled in the art upon the reading and understanding of the specification. The present disclosure includes all such equivalents and modifications and is limited only by the scope of the appended claims.

The invention claimed is:

1. A method of operating a user equipment (UE) to provide positioning related data for determining a position estimate of the UE, the UE being connected to a communications network via a radio link, the method comprising:
monitoring for a control channel associated with a positioning occasion in which positioning occasion the UE monitors for at least one positioning reference signal,
wherein the monitoring for the control channel occurs at least one of before, during, or after the positioning occasion, and
in the case that the monitoring for the control channel occurs during the positioning occasion, also monitoring for the control channel at least one of before or after monitoring for a predetermined positioning reference signal, in particular a first or last positioning reference signal of the positioning occasion,
wherein the control channel comprises an allocation configuration of resources for transmitting the positioning related data.

2. The method of claim 1, comprising
transmitting positioning related data using at least one of the resources according to the allocation configuration.

3. The method of claim 1,
wherein the positioning related data comprises an indication that further resources for transmitting positioning related data are required.

4. The method of claim 1,
wherein the positioning related data comprises an indication that no further resources for transmitting positioning related data are required.

5. The method of claim 1,
wherein the control channel comprises an indication of resources to be activated, by the UE, for receiving positioning reference signals.

6. The method of claim 1,
wherein the control channel comprises an indication to start, pause, continue or stop positioning measurements.

7. The method of claim 1,
wherein the positioning related data comprises measurement data and/or a positioning estimate.

8. The method of claim 1,
wherein the control channel is encoded with a temporary ID.

9. The method of claim 8,
wherein the temporary ID is associated with the UE or wherein the temporary ID is associated with a group of UEs including the UE.

10. The method of claim 1, further comprising
monitoring for multiple control channels associated with the positioning occasion.

11. A method of operating an access node (AN) for receiving positioning related data for determining a position estimate of a user equipment (UE) the UE being connected to a communications network via a radio link between the UE and the AN, the method comprising:
transmitting a control channel associated with a positioning occasion in which positioning occasion the UE monitors for at least one positioning reference signal,
wherein the monitoring for the control channel occurs at least one of before, during, or after the positioning occasion, and
in the case that the monitoring for the control channel occurs during the positioning occasion, also monitoring for the control channel at least one of before or after monitoring for a predetermined positioning reference signal, in particular a first or last positioning reference signal of the positioning occasion,
wherein the control channel comprises an allocation configuration of resources for transmitting the positioning related data.

12. The method of claim 11, comprising
receiving positioning related data using at least one of the resources according to the allocation configuration.

13. The method of claim 11,
wherein the positioning related data comprises an indication that further resources for transmitting positioning related data are required.

14. The method of claim 11,
wherein the positioning related data comprises an indication that no further resources for transmitting positioning related data are required.

15. The method of claim 11, wherein the control channel comprises an indication of resources to be activated, by the UE, for receiving positioning reference signals.

16. The method of claim 11, wherein the control channel comprises an indication to start, pause, continue or stop positioning measurements.

* * * * *